(12) United States Patent
Chien (10) Patent No.: US 8,131,247 B2
(45) Date of Patent: Mar. 6, 2012

(54) METHOD AND SYSTEM FOR AN INTERMEDIATE FREQUENCY (IF) CHANNEL SELECT FILTER WITH AN INTEGRATED ALTERNATE ADJACENT CHANNEL INTERFERENCE (AACI) FILTER

(75) Inventor: Hung-Ming Chien, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 373 days.

(21) Appl. No.: 12/469,032

(22) Filed: May 20, 2009

(65) Prior Publication Data

US 2010/0297976 A1 Nov. 25, 2010

(51) Int. Cl.
*H04B 1/10* (2006.01)
*H04B 1/16* (2006.01)

(52) U.S. Cl. ......... 455/307; 455/266; 455/311; 455/339

(58) Field of Classification Search .................. 455/280, 455/293, 296, 307, 311, 334, 338, 339, 266, 455/340
See application file for complete search history.

(56) References Cited

U.S. PATENT DOCUMENTS

| | | | | |
|---|---|---|---|---|
| 5,159,709 A | * | 10/1992 | Hansen | 455/266 |
| 6,047,171 A | * | 4/2000 | Khayrallah et al. | 455/266 |
| 6,426,683 B1 | * | 7/2002 | Gu et al. | 333/174 |
| 7,920,839 B2 | * | 4/2011 | Shi et al. | 455/226.2 |
| 2009/0213020 A1 | * | 8/2009 | Rentz et al. | 343/722 |

* cited by examiner

*Primary Examiner* — Nguyen Vo
(74) *Attorney, Agent, or Firm* — Thomas, Kayden, Horstemeyer & Risley, LLP (57) ABSTRACT

An alternate adjacent channel interference (AACI) filter is integrated into an intermediate frequency (IF) channel select filter to filter received RF signals. The IF channel select filter is an IF staged structure comprising successive IF stages. Each of the successive IF stages is a 2-biquad integrator. The AACI filter is integrated into the first IF stage of the IF channel select filter by re-using circuit components such as an operational amplifier, an input resistor, and a shunt capacitor of the first IF stage. The shunt capacitor is coupled between a middle point of the input resistor and ground. The AACI filter is realized via different equivalent implementations of the re-used circuit components of the first IF stage. A value of the shunt capacitor of the AACI filter becomes a fixed-value when a value the input resistor is inversely proportional to the bandwidth of the AACI filter.

12 Claims, 6 Drawing Sheets

METHOD AND SYSTEM FOR AN INTERMEDIATE FREQUENCY (IF) CHANNEL SELECT FILTER WITH AN INTEGRATED ALTERNATE ADJACENT CHANNEL INTERFERENCE (AACI) FILTER

CROSS-REFERENCE TO RELATED APPLICATIONS/INCORPORATION BY REFERENCE

Not applicable.

FIELD OF THE INVENTION

Certain embodiments of the invention relate to communication systems. More specifically, certain embodiments of the invention relate to a method and system for an intermediate frequency (IF) channel select filter with an integrated alternate adjacent channel interference (AACI) filter.

BACKGROUND OF THE INVENTION

A wireless transmitter transmits wireless signals via a wireless medium and a wireless communication device comprising a receiver is operable to receive and recover the transmitted wireless signals from the wireless medium. The manner in which the wireless signals are communicated via the wireless medium is dependent upon, for example, the wireless communication standard, or standards, being supported by the wireless communication devices. For example, IEEE 802.11a defines an orthogonal frequency division multiplexing (OFDM) wireless transmission protocol that includes eight 20 MHz spaced channels in the lower band (e.g., 5.15 gigahertz to 5.35 gigahertz) and four 30 MHz spaced channels in the upper band (e.g., 5.725 gigahertz to 5.825 gigahertz). Typically, during a wireless transmission, data is carried over a desired channel to a target receiver. A target receiver may be operable to tune one or more intermediate frequency (IF) stages so that a desired channel is centered within the filter response of the target receiver. As such, the desired channel is received and converted to a baseband signal, which is subsequently decoded to obtain the transmitted data.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for an intermediate frequency (IF) channel select filter with an integrated alternate adjacent channel interference (AACI) filter, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for an intermediate frequency (IF) channel select filter with an integrated alternate adjacent channel interference (AACI) filter. In accordance with various embodiments of the invention, an alternate adjacent channel interference (AACI) filter may be integrated into an intermediate frequency (IF) channel select filter. The IF channel select filter together with the integrated AACI filter may be operable to filter a received RF signal. The IF channel select filter may comprise successive IF stages. Each of the successive IF stages of the IF channel select filter may be implemented as a 2-biquad integrator. The AACI filter may be integrated into the first IF stage of the IF channel select filter. The integrated AACI filter may be operable to re-use circuit components of the first IF stage to form a first order RC filter. The circuit components that are used for AACI may comprise an operational amplifier, an input resistor, and a shunt capacitor. The AACI filter may be realized via shunting a capacitor between a middle point of the input resistor and ground. A value of the shunt capacitor of the AACI filter becomes a fixed-value when a value the input resistor is set so that it is inversely proportional to the bandwidth of the AACI filter.

Figure 1:
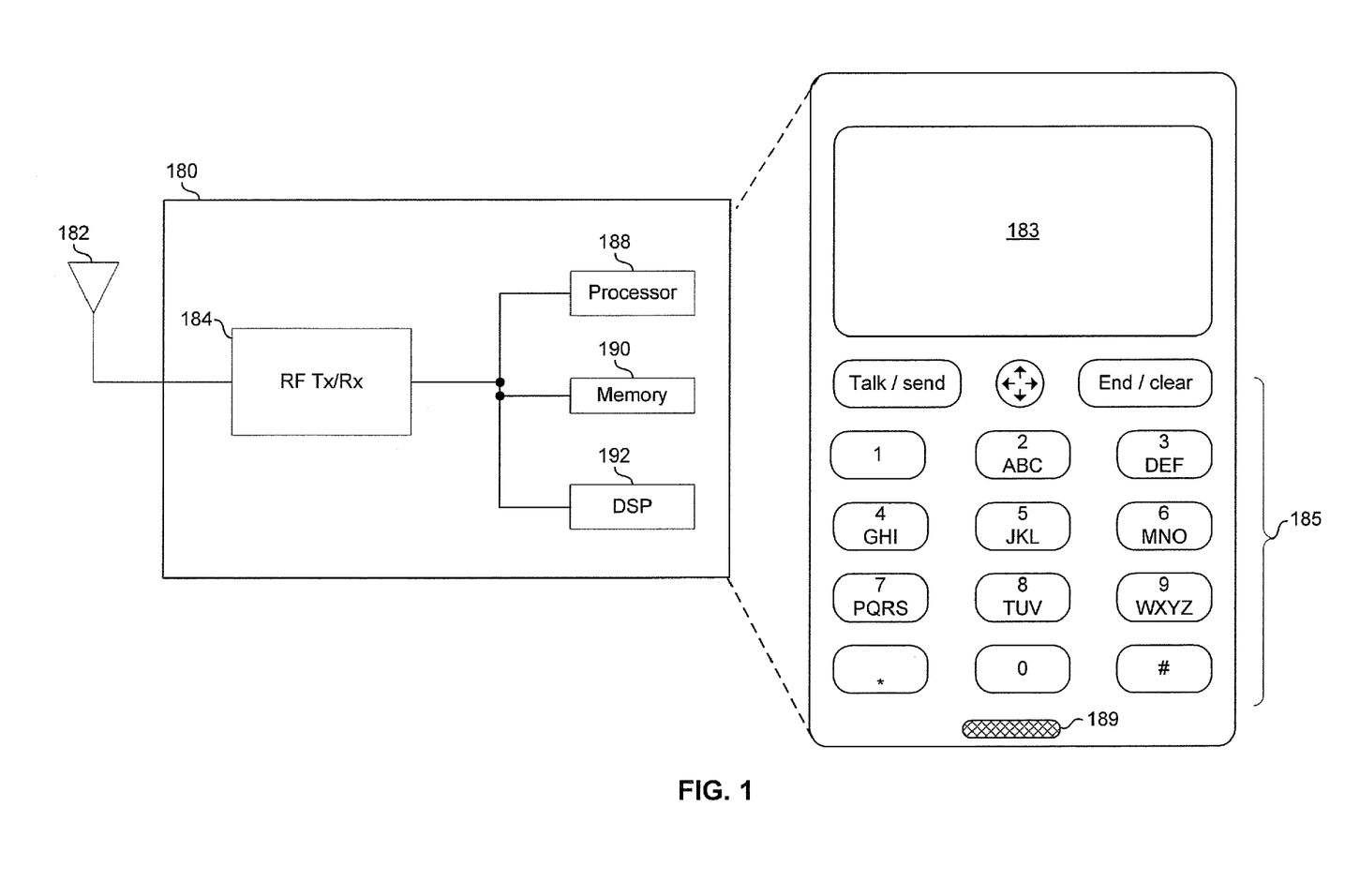
FIG. 1 is a block diagram of an exemplary communication device that utilizes an intermediate frequency (IF) channel select filter with an integrated AACI filter in a radio frequency (RF) receiver, in accordance with an embodiment of the invention.

FIG. 1 is a block diagram of an exemplary communication device that utilizes an intermediate frequency (IF) channel select filter with an integrated AACI filter in a radio frequency (RF) receiver, in accordance with an embodiment of the invention. The communication device 180 may comprise an antenna 182, a radio frequency (RF) transmitter and/or receiver (Tx/Rx) 184, a processor 188, a memory 190, a DSP 192, a display 183, user controls 185, a speaker 187, and a microphone 189.

The antenna 182 may be suitable for transmitting and/or receiving electromagnetic signals. Although a single antenna is illustrated, the invention is not so limited. In this regard, the RF Tx/Rx 184 may utilize a common antenna for transmission and reception of signals adhering to one or more wireless standards, may utilize different antennas for each supported wireless standard, and/or may utilize a plurality of antennas for each supported wireless standard.

The RF Tx/Rx 184 may comprise suitable logic circuitry and/or code that may be operable to transmit and/or receive data utilizing one or more wired, wireless, and/or optical standards. In various exemplary embodiments of the invention, the RF Tx/Rx 184 may be operable to communicate in adherence with cellular, WiMAX, Wi-Fi, Bluetooth, Zigbee, T1/E1, Ethernet, USB, IEEE 1394, analog audio standards, analog video standards, digital audio standards, and/or digital video standards. The RF Tx/Rx 184 may be operable to perform amplification, down-conversion, filtering, demodulation, and analog to digital conversion of received signals. The radio frequency transceiver 184 may be operable to perform amplification, up-conversion, filtering, modulation, and digital to analog conversion of signals to be transmitted.

The processor 188 may comprise suitable logic, circuitry, and/or code that may enable processing of data and/or controlling of operations of the communication device 180. In this regard, the processor 188 may be enabled to provide control signals to the various other portions comprising the communication device 180. The processor 188 may also control transfers of data between various portions of the communication device 180. Additionally, the processor 188 may enable execution of applications programs and/or code for processing data and effectuating operation of the communication device 180.

The memory 190 may comprise suitable logic, circuitry, and/or code that may enable storage or programming of information comprising parameters and/or code that may effectuate the operation of the communication device 180. Stored information may comprise received data and/or data to be presented, transmitted, and/or otherwise processed. The parameters may comprise configuration data and the code may comprise operational code such as software and/or firmware, but the information need not be limited in this regard.

The DSP 192 may comprise suitable logic, circuitry, and/or code operable to perform computationally intensive processing of data. In various embodiments of the invention, the DSP 192 may encode, decode, transcode, modulate, demodulate, encrypt, decrypt, scramble, descramble, and/or otherwise process data.

The display 183 may be operable to provide visual presentation of information to, and/or enable interaction by, a user of the communication device 180. In various embodiments of the invention, a graphical user interface may be presented via the display 183. In various embodiments of the invention, a visual media content such as video, images, and text may be presented via the display 183.

The user controls 185 may be operable to enable user interaction with the communication device 180 to control services and/or content handled by the communication device 180. The user controls 185 may comprise, for example, a keypad, a keyboard, a roller ball, a multidirectional button, a scroll wheel or other navigation device, and/or a touch screen.

The speaker 187 may be operable to present audio information to a user. The speaker may present voice from a phone call and/or music or ringtones played back by the cellular enabled communication device.

The microphone 189 may be operable to convert acoustic signals into electronic signals. The microphone may enable a user to participate in a phone call and/or interact with the cellular enabled communication device via oral input.

In operation, the radio frequency transceiver 184 may receive data formatted according to one or more communication standards, process the data, and output digital baseband data to the processor 188, the memory 190, and/or the DSP 192. In this regard, a noise reduction technique may be utilized to process the received data by using, for example, an integrated alternate adjacent channel interference (AACI) filter. The integrated AACI filter may be enabled to remove alternate adjacent channel signals from the received data. The digital baseband data may be processed by the processor 188, the memory 190, and/or the DSP 192 to effectuate operation of the communication device 180 and/or for presentation of content to a user of the communication device 180.

Figure 2:
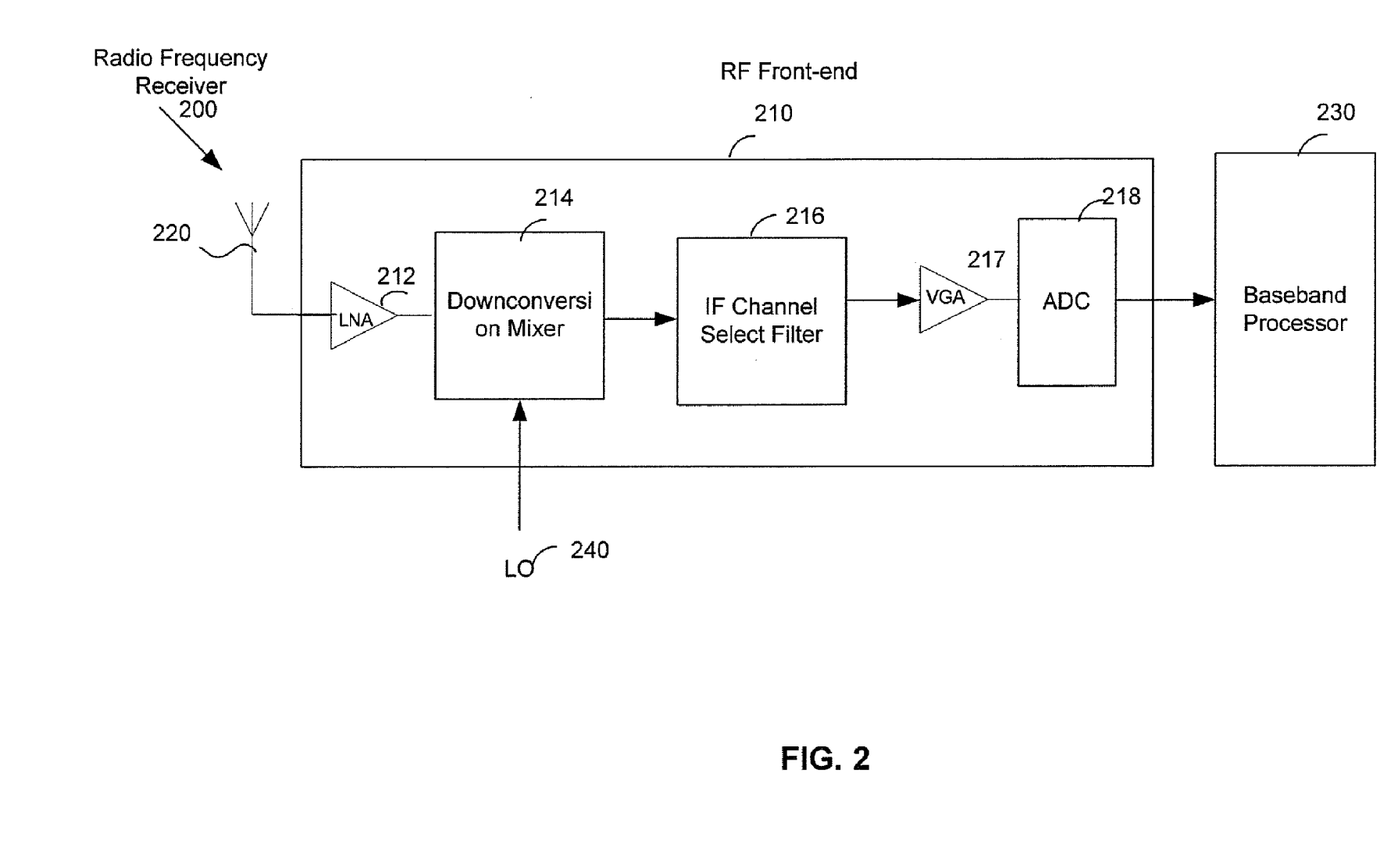
FIG. 2 is a diagram illustrating an exemplary radio frequency (RF) receiver that comprises an intermediate frequency (IF) channel select filter with an integrated AACI filter, in accordance with an embodiment of the invention.

FIG. 2 is a diagram illustrating an exemplary radio frequency (RF) receiver that comprises an intermediate frequency (IF) channel select filter with an integrate AACI filter, in accordance with an embodiment of the invention. Referring to FIG. 2, there is shown a radio frequency receiver 200 comprising a RF front-end 210, an antenna 220, a baseband processor 230, and a local oscillator (LO) 240. The RF front-end 210 comprises a low noise amplifier (LNA) 212, a down-conversion mixer 214, an IF channel-select filter 216, and analog-to-digital converter (ADC) 218.

The RF front-end 210 may comprise suitable logic, circuitry, and/or code that may be operable to process a received RF signals received via the antenna 220. The RF front-end 210 may enable conversion of the received RF signal to a baseband frequency signal to be processed by the baseband processor 130.

The LNA 212 may comprise suitable logic, circuitry and/or code that may be operable to amplify a received RF signals from the antenna 220. The LNA 212 may be configured to set a fixed-gain typically used for initial amplification of the received a received RF signals. The fixed-gain may specify a limit for how low a system noise figure may reach. The LNA 212 may be enabled to achieve a low noise performance, which is crucial for a high performance radio frequency (RF) front-end.

The downconversion mixer 214 may comprise suitable logic, circuitry and/or code that may be operable to translate the resulted signals from the LNA 212 to a lower, intermediate frequency (IF) signals in conjunction with the local oscillator (LO) 240. Contents in a passband associated with the downconversion mixer 214 may be translated in frequency to a fixed IF. The fixed IF may reside at the center of the IF channel-select filter 216. The contents may comprise desired data as well as noises within the passband.

The IF channel-select filter 216 may comprise suitable logic, circuitry and/or code that may be enabled to retrieve received RF signals from the antenna 220 and/or remove unwanted channel signals. The IF channel-select filter 216 may be operable to locate a desired channel signal within an IF band of interest among the pass band of the IF channel-select filter 216. For example, depending on implementation, in instances that the IF channel-select filter 216 may be realized via a low pass filter (LPF), the IF channel-select filter 216 may be enabled to locate the desired channel signal to reside at the center of corresponding lowpass band of the IF channel-select filter 216. The IF channel-select filter 216 may be utilized to pass desired channel signals and reject unwanted channel signals. In this regard, an alternate adjacent channel interference (AACI) filter may be integrated into the IF channel-select filter 216 and may be used to reject larger-amplitude alternate-channel signals.

The variable-gain amplifier (VGA) 217 may comprise suitable logic, circuitry and/or code that may be operable to amplify signals from the IF channel-select filter 216. In this regard, the VGA 217 may be operable to amplify of boost the desired channel signal from the IF channel-select filter 216. The VGA 217 may be set to different gains resulting a variable signal level at the input to the ADC 218.

The ADC 218 may comprise suitable logic, circuitry and/or code that may be operable to convert received analog signals from the VGA 217 to digital data (e.g., bytes) comprising values that are representative of the signal amplitude. The digital data may be communicated with the baseband processor 230 for further baseband processing.

The baseband processor 230 may comprise suitable logic, circuitry, interfaces and/or code that may be operable to process digitized baseband signals from the ADC 218. The baseband processor 230 may be enabled to extract information conveyed in a received RF signal. The baseband processor 230 may be enabled to perform such operations as demodulation, decorrelation, decoding, and error correction.

The LO 240 may comprise suitable logic, circuitry, and/or code that may enable generating a stable reference frequency to be used for achieving channel tuning.

In an exemplary operation, the received RF signals from the antenna 220 may be amplified by the LNA 212. The amplified RF signals may be translated to lower, intermediate frequency (IF) signals in conjunction with the local oscillator (LO) 240. The IF channel-select filter 216 may be enabled to convert the IF signals from the LNA 214 to reside at the center of the IF channel-select filter 216. In this regard, the IF channel-select filter 216 may be enabled to pass signals within a desired band and reject adjacent channel signals as well as alternate adjacent channel signals. Moreover, the IF channel select filter 216 may be coupled with an AACI filter for removing alternate adjacent channel signals. Following the IF channel-select filter 216, the desired channel signals are boosted by the variable-gain amplifier (VGA) 217 to the baseband processor 230 via the ADC 218 for further signal processing.

Figure 3:
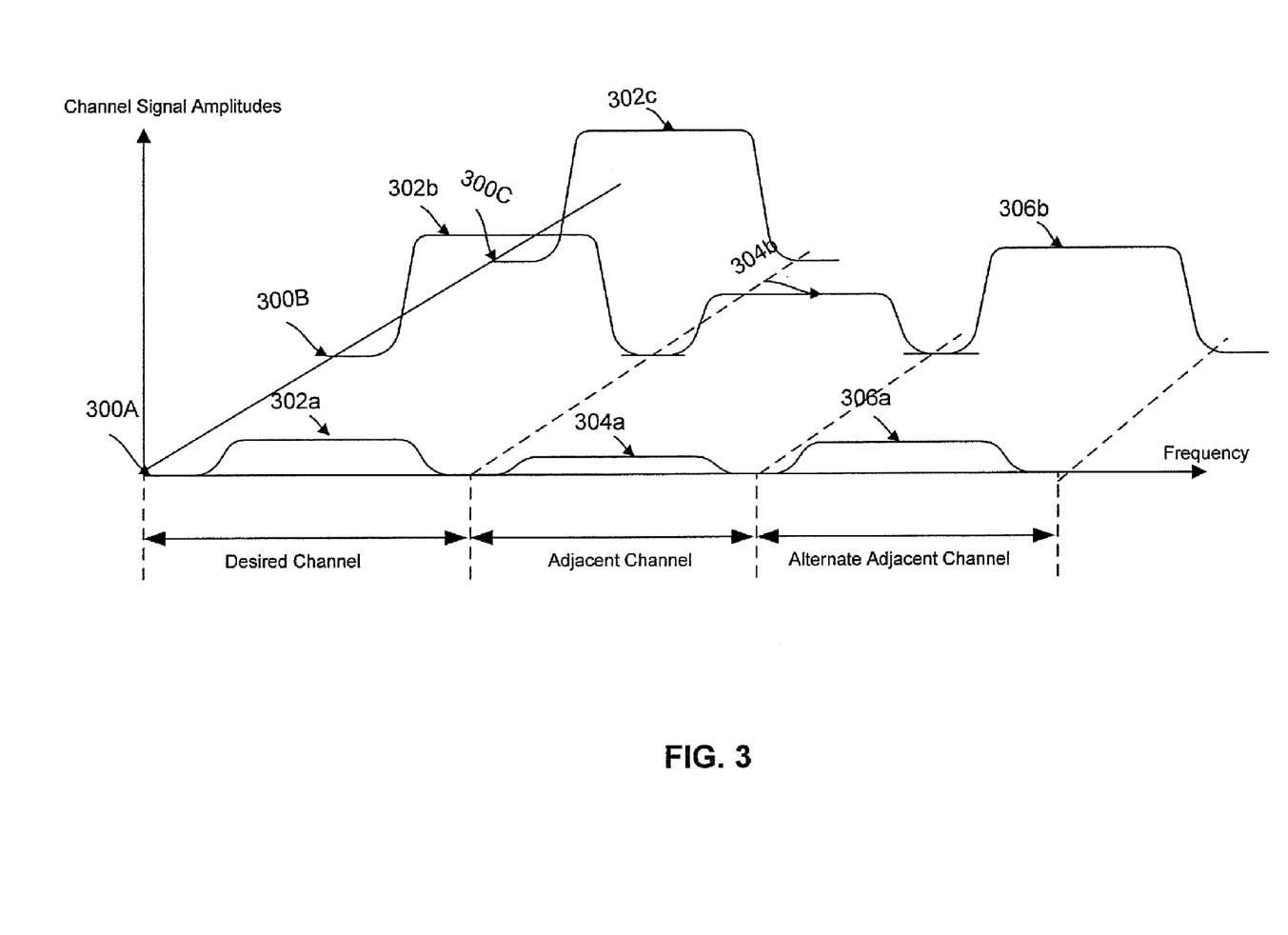
FIG. 3 is a diagram illustrating an exemplary graphical representation of a received radio frequency signal received by a radio frequency (RF) receiver, in accordance with an embodiment of the invention.

FIG. 3 is a diagram illustrating an exemplary graphical representation of an a received radio frequency signal received by a radio frequency (RF) receiver, in accordance with an embodiment of the invention. Referring to FIG. 3, there is shown a signal 300A, a signal 300B, and a signal 300C. The signal 300A is a channel signal response of a received RF signal received by the antenna 220. The signal 300B is a channel signal response of an output of the LNA 212. The signal 300C is a channel signal response of an output of the IF channel-select filter 216. The signal 300A comprises channel signal component 302a in a desired channel, channel signal component 304a in an adjacent channel, and channel signal component 306a in an alternate adjacent channel, respectively. The signal 300A transverses the LNA 212 following the signal path to the output of the LNA 212.

The output of the LNA 212 is a linear amplified version of the received RF signal. Accordingly, the signal 300B is the amplified version of the signal 300A. The signal components 302b, 304b, and 306b represent amplified versions of the signal component 302a, 304a, and 306a, respectively. Following the LNA 212, the signal 300b transverses the downconversion mixer 214 and the IF channel select filter 216 to the output of the IF channel select filter 216. The signal 300C represent the channel signal response of the output of the IF channel select filter 216. The radio frequency receiver 200 may be enabled to tune the IF channel select filter 216 via the LO 240 such that the desired channel signal component such as the signal 302c may be received for processing by the baseband processor 230 to retrieve transmitted data. In this regard, the IF channel select filter 216 may be enabled to pass signal components such as the signal 302c in the desired channel and filter out signal components such as the signal 304b and 306b in an alternate adjacent channel and an adjacent channel, respectively. The signal components in the alternate adjacent channel, for example, the signal 306c, may be removed by using an AACI filter integrated into the IF channel select filter 216.

Figure 4:
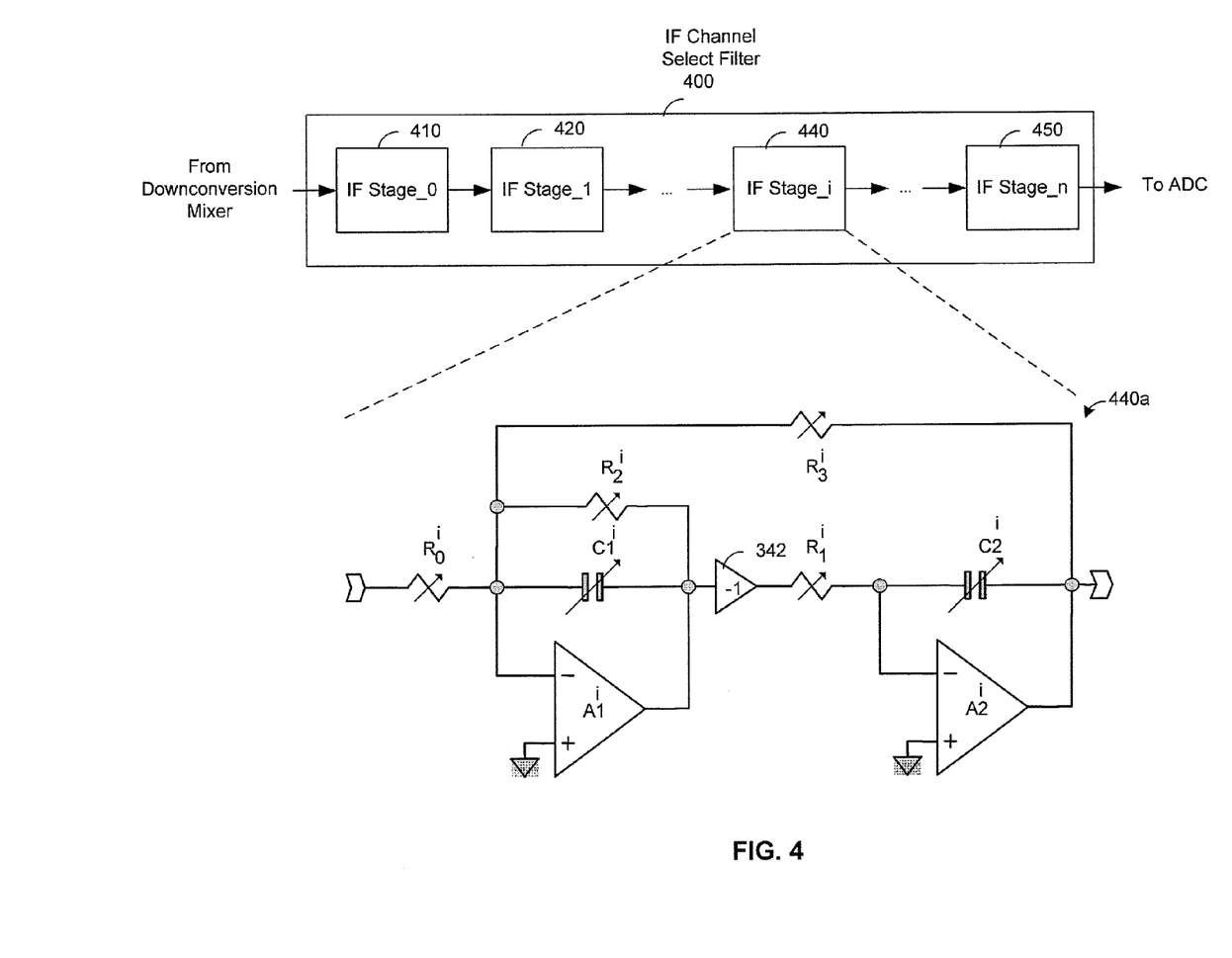
FIG. 4 is a diagram illustrating an exemplary intermediate frequency (IF) channel select filter comprising a plurality of IF stages, in accordance with an embodiment of the invention.

FIG. 4 is a diagram illustrating an exemplary intermediate frequency (IF) channel select filter that comprising a plurality of IF stages, in accordance with an embodiment of the invention. Referring to FIG. 4, there is shown an IF channel select filter 400 comprising a plurality of intermediate frequency (IF) stages, of which IF stage_0 410~IF stage_n 450, are displayed, where n is a positive integer number.

Each of the plurality of IF stages such as the IF stage_i 440 may comprise suitable logic, circuitry, and/or code that may be enabled to capture IF signal components within a desired channel to produce a selected channel signal. The IF stage_i 440 may be operable to remove interferences and noise from the received IF signal components. The IF stage_i 440 may be frequency selective to filter out signal components within unwanted channels. The IF stage_i 440 may be implemented as a 2-biquad integrator 440a. The 2-biquad integrator 440a may be adopted to implement various filtering functions such as the Butterworth function or the Chebyshev function. The 2-biquad integrator 440a may comprise resistors $R_0^i, R_1^i, R_2^i$, and $R_3^i$, capacitors $C_1^i$ and $C_2^i$, an inverter 342, and Operational amplifiers $A_1^i$, and $A_2^i$. The resistances of the resistors $R_0^i, R_1^i, R_2^i$, and $R_3^i$ may be configured to improve a desired amplitude stability of the 2-biquad integrator 440a. The capacitors $C_1^i$ and $C_2^i$ may be realized utilizing any known techniques for on-chip capacitors. The capacitance of the capacitors $C_1^i$ and $C_2^i$ may be determined based on a desired frequency response and/or noise requirement of the IF stage_i 440. Each IF stage of the IF channel select filter 400 may be concatenated so that they are operable to remove unwanted channel components outside the desired channel. In this regard, the first IF stage, the IF stage_0 410, may be coupled to an AACI filter to remove unwanted channel components within an alternate adjacent channel.

In operation, desired frequency responses for each IF stage of the IF channel select filter 400 may be configured. The IF stage parameters such as resistances, capacitances, and amplify gains may be determined based on a desired frequency response of corresponding IF stage. In instances that the first IP stage_0 410 may receive RF signals from the downconversion mixer 214. The first IF stage_0 410 may be enabled to pass channel signal components within a desired channel and remove unwanted channel signal components within adjacent channels and alternate adjacent channels. In this regard, the first IF stage_0 410 may be enabled to utilize an integrated AACI filter for removing channel signal components within the alternate adjacent channels. Following the first IF stage_0 410, the received RF signals from the downconversion mixer 214 may be further filtered via successive IF stages of the IF channel select filter 400. The IF stage_0 410~the IF stage_n 450 are operable to suppress interferences to the desired channel signal components from the adjacent channels as well as the alternate adjacent channels.

Figure 5:
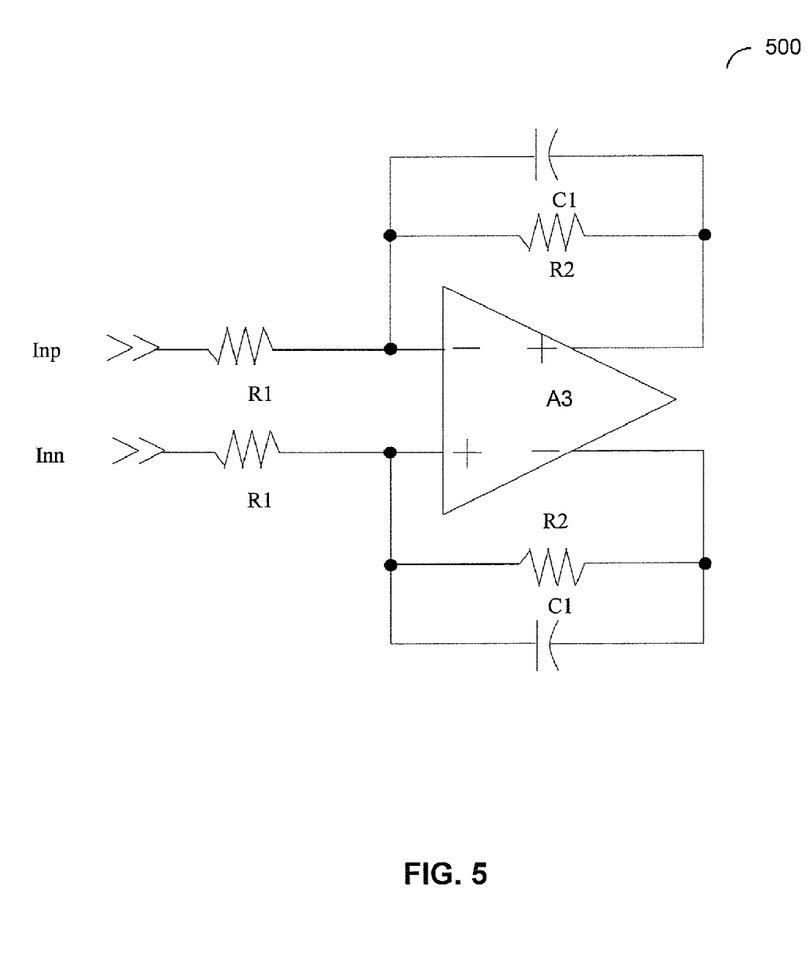
FIG. 5 is a circuit diagram illustrating an alternate adjacent channel interference (AACI) filter integrated into an intermediate frequency (IF) channel select filter within a radio frequency (RF) receiver, in accordance with an embodiment of the invention.

FIG. 5 is a circuit diagram illustrating an alternate adjacent channel interference (AACI) filter integrated into an intermediate frequency (IF) channel select filter within a radio frequency (RF) receiver, in accordance with an embodiment of the invention. Referring to FIG. 5, there is shown an AACI filter 500 implemented via a single stage active RC filter.

The AACI filter 500 may comprise resistors $R_1$ and $R_2$, capacitors $C_1$, and an operational amplifier $A_3$. The resistances of the resistors $R_1$ and $R_2$ may be configured to set the gain of the single stage active RC filter. The capacitance of the capacitors $C_1$ may be determined based on desired alternate adjacent frequencies for corresponding filtering. The AACI filter 500 may be enabled to remove channel components within the alternate adjacent channels based on a manner in which it is coupled to the first IF stage 320 of the IF channel select filter 400. Due to the low noise requirement, the capacitors $C_1$ and the operational amplifier $A_3$ may occupy large chip area and consume large power. In this regard, the capacitor $C_0^0$ and the operational amplifier $A_1^0$ of the first IF stage_0 410 may be re-used for the AACI filter 500. In this regard, the total chip area and power consumption for the AACI filter 500 may be reduced.

Figure 6:
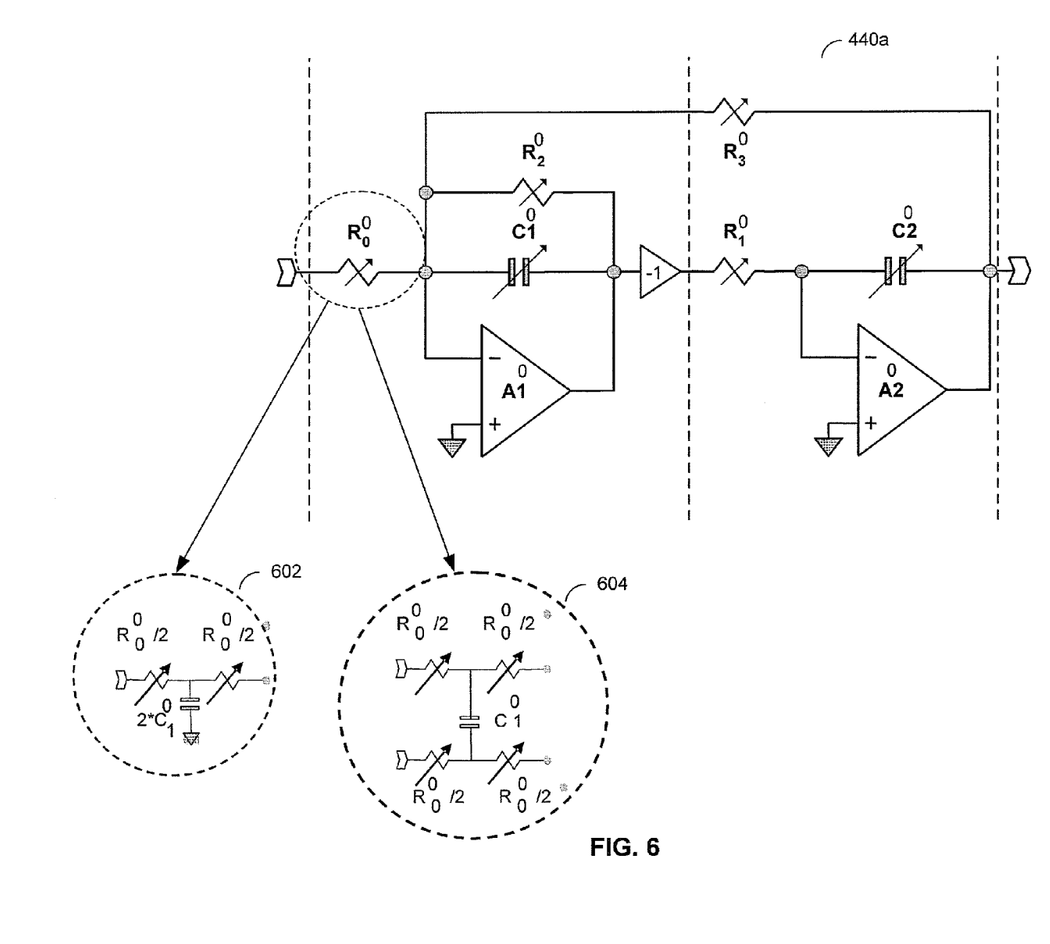
FIG. 6 is a diagram illustrating an exemplary alternate adjacent channel interference (AACI) filter integrated into an IF stage of a radio frequency (RF) receiver circuit, in accordance with an embodiment of the invention.

FIG. 6 is a diagram illustrating an exemplary alternate adjacent channel interference (AACI) filter integrated into an IF stage of a radio frequency (RF) receiver circuit, in accordance with an embodiment of the invention. Referring to the FIG. 6, the AACI filter 500 may be coupled to the first IF stage_0 410. The input resistor $R_0^0$, the operational amplifier $A_1^0$, and the capacitor $C_1^0$ in the first IF stage_0 410 may be re-utilized to integrate functions of the AACI filter 500.

In an exemplary implementation as presented in 602, the input resistor $R_0^0$ and the capacitor $C_1^0$ may be implemented serially to form a first order RC circuit coupled to the first IF stage_0 410. In 602, the input resistor $R_0^0$ may be split into two input resistors of $R_0^0/2$. A shunt capacitor of $2C_1^0$ may be placed in the middle of the two input resistors of $R_0^0/2$. For more general implementation, $R_0^0$ may be split into two resistors with un-equal values. With a shunting capacitor connecting between the middle node of the two resistors and ground, it may form a general form of AACI filter.

In another exemplary implementation as presented in 604, the input resistor $R_0^0$ and the capacitor $C_1^0$ may be implemented differentially to form a first order RC circuit coupled to the first IF stage_0 410. In 604, the first order RC filter may be realized by splitting the input resistor $R_0^0$ into four input resistors of $R_0^0/2$ together with a shunt capacitor of $C_1^0$.

The input resistor $R_0^0$ may be chosen to be approximately inversely proportional to the bandwidth of the IF channel select filter 400 such that the shunt capacitor for AACI filter 500 may be fixed, for example, around 2 pF.

Aspects of a method and system for an intermediate frequency (IF) channel select filter with an integrated alternate adjacent channel interference (AACI) filter are provided. In accordance with various embodiments of the invention, the AACI filter 500 may be integrated into the IF channel select filter 216. The IF channel select filter 216 with the integrated AACI filter 500 may be operable to filter a received RF signal that may be received by the antenna 220. The IF channel select filter 216 may comprise a plurality of IF stages as presented in FIG. 4. The IF channel select filter 400 may comprise successive IF stages such as the IF stages 410 through 450. Each of the IF stages 410 through 450 may be implemented as the 2-biquad integrator 440a. The AACI filter 500 may be integrated into the first IF stage such as the IF stage_0 410 of the IF channel select filter 400. The integrated AACI filter 500 may re-use circuit components of the first IF stage_0 410 to form a first order RC filter. The circuit components re-used in the IF stage_0 410 may comprise the operational amplifier $A_1^0$, the input resistor $R_0^0$, and the shunt capacitor $C_1^0$. As shown with respect to FIG. 6, the shunt capacitor $C_1^0$ is placed between the middle of the split input resistor $R_0^0$ and ground. The AACI filter 500 may be realized via different equivalent implementations such as 602 or 604 of the input resistor $R_0^0$ and the shunt capacitor $C_1^0$. A value of the shunt capacitor $C_1^0$ for the AACI filter 500 is a fixed-value when a value of the input resistor $R_0^0$ is set so that it is inversely proportional to the bandwidth of the AACI filter 500.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for an intermediate frequency (IF) channel select filter with an integrated alternate adjacent channel interference (AACI) filter.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
   receiving a signal by an intermediate frequency (IF) channel select filter comprising an integrated alternate adjacent channel interference (AACI) filter; and
   filtering said received signal using said IF channel select filter and said integrated AACI filter,
   wherein said IF channel select filter comprises one or more successive IF stages, said integrated alternate adjacent channel interference filter is coupled to a first IF stage of said one or more successive IF states and re-uses circuit components of the first IF stage, and said circuit components comprising an operational amplifier, an input resistor, and a shunt capacitor of said first IF stage.

2. The method according to claim 1, wherein each of said one or more successive IF stages is implemented as a 2-biquad integrator.

3. The method according to claim 1, wherein said shunt capacitor of said first IF stage is coupled between a middle point of said input resistor and ground.

4. The method according to claim 1, wherein said integrated alternate adjacent channel interference filter is realized utilizing one or more equivalent implementations of said input resistor and said shunt capacitor.

5. The method according to claim 1, wherein a value of said input resistor is inversely proportional to a bandwidth of said AACI filter.

6. The method according to claim 5, wherein a value of said shunt capacitor is a fixed-value when said value of said input resistor is set so that it is inversely proportional to said bandwidth of said AACI filter.

7. A system for communication, the system comprising:
one or more circuits for use in a receiver, said one or more circuits comprising an intermediate frequency (IF) channel select filter and an alternate adjacent channel interference (AACI) filter, wherein:
said IF channel select filter comprises one or more successive IF stages;
said AACI filter is integrated in said IF channel select filter;
said one or more circuits is operable to receive a signal;
said one or more circuits is operable to filter said received signal using said IF channel select filter and said integrated AACI filter;
said integrated AACI filter is coupled to first IF stage of said one or more successive IF stages;
said integrated alternate adjacent channel interference filter re-uses circuit components of said first IF stage; and
said circuit components comprise an operational amplifier, an input resistor, and a shunt capacitor of said first IF stage.

8. The system according to claim 7, wherein each of said one or more successive IF stages is implemented as a 2-bi-quad integrator.

9. The system according to claim 7, wherein said shunt capacitor of said first IF stage is coupled between a middle point of said input resistor and ground.

10. The system according to claim 7, wherein said integrated alternate adjacent channel interference filter is realized utilizing one or more equivalent implementations of said input resistor and said shunt capacitor.

11. The system according to claim 7, wherein a value of said input resistor is inversely proportional to a bandwidth of said AACI filter.

12. The system according to claim 11, wherein a value of said shunt capacitor is a fixed-value when said value of said input resistor is set so that it is inversely proportional to said bandwidth of said AACI filter.

* * * * *